(12) United States Patent
Yang

(10) Patent No.: US 8,730,403 B2
(45) Date of Patent: May 20, 2014

(54) VIDEO COMMUNICATION DEVICE AND METHOD THEREOF

(75) Inventor: Zhibing Yang, Huizhou (CN)

(73) Assignee: Huizhou TCL Mobile Communciation Co., Ltd., Chengjiang Town (CN)

( * ) Notice: Subject to any disclaimer, the term of this patent is extended or adjusted under 35 U.S.C. 154(b) by 0 days.

(21) Appl. No.: 13/702,312

(22) PCT Filed: Oct. 12, 2011

(86) PCT No.: PCT/CN2011/080707
§ 371 (c)(1),
(2), (4) Date: Dec. 6, 2012

(87) PCT Pub. No.: WO2012/088943
PCT Pub. Date: Jul. 5, 2012

(65) Prior Publication Data
US 2013/0265495 A1    Oct. 10, 2013

(30) Foreign Application Priority Data

Dec. 28, 2010 (CN) .......................... 2010 1 0609763

(51) Int. Cl.
*H04N 5/63* (2006.01)
(52) U.S. Cl.
USPC ........... 348/730; 348/725; 348/715; 348/564; 348/565; 348/569; 348/586; 348/429.1; 348/474; 348/231.9; 348/211.1; 348/208.15; 348/33.31; 348/14.02; 348/14.01
(58) Field of Classification Search
USPC ......... 348/730, 725, 14.02, 33.31; 455/343.1, 455/343.6, 343.5, 573, 572
See application file for complete search history.

(56) References Cited

U.S. PATENT DOCUMENTS

| | | |
|---|---|---|
| 5,726,636 A | 3/1998 | Hayes, Jr. |
| 5,901,361 A | 5/1999 | Luong |
| 6,134,457 A | 10/2000 | Ha et al. |
| 7,050,829 B2 | 5/2006 | Motohashi |
| 7,177,690 B2 * | 2/2007 | Woods et al. .................. 607/29 |
| 7,378,818 B2 * | 5/2008 | Fowler et al. ................. 320/119 |
| 7,626,365 B2 * | 12/2009 | Patino et al. .................. 320/138 |
| 7,756,322 B2 * | 7/2010 | Saitou et al. .................. 382/153 |
| 7,966,045 B2 * | 6/2011 | Beach et al. .................. 455/574 |
| 7,983,650 B2 * | 7/2011 | Masuda ..................... 455/343.2 |
| 8,271,053 B2 * | 9/2012 | Choi et al. .................... 455/573 |
| 2005/0041839 A1 * | 2/2005 | Saitou et al. .................. 382/103 |
| 2006/0085167 A1 * | 4/2006 | Warfield et al. .............. 702/188 |

(Continued)

FOREIGN PATENT DOCUMENTS

| CN | 1245609 A | 2/2000 |
|---|---|---|
| CN | 1090883 | 9/2002 |

(Continued)

*Primary Examiner* — Jefferey Harold
*Assistant Examiner* — Mustafizur Rahman
(74) *Attorney, Agent, or Firm* — Mark M. Friedman

(57) ABSTRACT

The present invention discloses a video communication device and a method thereof, the method comprises: obtain a current battery energy level of a device; load information of the battery energy level to a ready-to-send video; execute video encoding to the ready-to-send video and sending the same. The present invention can display the information of the energy level of one party's device on the video communication image of another party's device, so that another party can realize the actually current battery energy level of one party's device, tempos of the video communication can be controlled well, effects of the video communication can be raised.

8 Claims, 2 Drawing Sheets

(56) References Cited

U.S. PATENT DOCUMENTS

| | | | |
|---|---|---|---|
| 2006/0120086 A1* | 6/2006 | Yuen | 362/346 |
| 2007/0243852 A1* | 10/2007 | Gibbs | 455/343.5 |
| 2008/0185915 A1* | 8/2008 | Wang | 307/64 |
| 2009/0051223 A1* | 2/2009 | Woo | 307/80 |
| 2010/0130263 A1* | 5/2010 | Zhang et al. | 455/572 |
| 2010/0176760 A1* | 7/2010 | Bullen | 320/101 |
| 2011/0039605 A1* | 2/2011 | Choi et al. | 455/573 |

FOREIGN PATENT DOCUMENTS

| | | |
|---|---|---|
| CN | 1377188 A | 10/2002 |
| CN | 101246977 A | 8/2008 |
| CN | 101340730 A | 1/2009 |
| CN | 101488333 A | 7/2009 |
| CN | 102065581 A | 5/2011 |

\* cited by examiner

VIDEO COMMUNICATION DEVICE AND METHOD THEREOF

TECHNICAL FIELD OF THE INVENTION

The present invention relates to a field of mobile communication, more particularly to a video communication device and a method thereof.

BACKGROUND OF THE INVENTION

With more and more functions of wireless communication apparatus (e.g. mobile phones and interphones) and bigger and bigger screens of the wireless communication apparatus, demands for more energy of a battery are growing more and more. Although the energy of the battery is increased, lack of battery energy is still a problem to be faced when people use their wireless communication apparatus. For example, when one party is communicating with another party, the wireless communication apparatus shuts down suddenly due to the wireless communication apparatus being out of battery, this is an embarrassing situation for both parties.

With the advent of 3G era, the video communications are utilized by many users increasingly, dynamic video information and audio information can be sent through the video phone, so that great communication effects are achieved. However, the video communication is an application with a great amount of energy consumption, and a user is often worried about a video communication interruption due to out of battery when the user is using the video communication.

Therefore, a power prompting function is usually set up in the wireless communication apparatus. However, the traditional energy prompting function can only prompt the battery energy to one party of the apparatus, but cannot automatically prompt to the party on the other end. Because the party on the other end cannot realize the information of the battery energy of the user's apparatus directly, the video communication interruption may occur suddenly, tempos of the video communication cannot be controlled well.

SUMMARY OF THE INVENTION

A video communication device and a method thereof of the present invention are provided to solve main technical problems, a current information of a battery energy level of one party's video communication device can be displayed on images which another party receives, and the images which another party receives can be updated with variations of the battery energy level of the one party's device, thus another party can completely realize the information of the battery energy level of one party's device, tempos of a video communication can be controlled well.

In order to solve the above-mentioned problem, the present invention adopts a technical solution: providing a video communication method, comprising: a. obtain a current battery energy level of a device, setting a plurality of energy sections and a plurality of energy indicators corresponding to the respective energy sections, determining which one of the energy sections the current battery energy level is sited, and then obtaining a corresponding energy indicator thereof; b. select every frame of a ready-to-send video as a background frame, superimpose the corresponding energy indicator on the background frames in sequence, and select frames with an interval of a predetermined number of frames in the ready-to-send video as the background frames, superimpose the energy indicator on the background frames in sequence when the current battery energy level is lower than a threshold value; and c. execute video encoding to the ready-to-send video and send the same.

In the video communication method, such that the threshold value is 5% of the total battery energy level and the predetermined number of frames is two frames.

In order to solve the above-mentioned problem, the present invention adopts a technical solution: providing a video communication method, comprising: a. obtain a current battery energy level of a device and a corresponding energy indicator according to the current battery energy level; b. load the corresponding energy indicator to the ready-to-send video; and c. execute video encoding to the ready-to-send video and send the same.

In step a of the video communication method, such that a plurality of energy sections and a plurality of energy indicators corresponding to the respective energy sections are set, and which one of the energy sections the current battery energy level is sited is determined, and then a corresponding energy indicator thereof is obtained.

In step b of the video communication method, such that every frame of a ready-to-send video is selected as a background frame, and the corresponding energy indicator is superimposed on the background frame in sequence.

In step b of the video communication method, such that frames with an interval of a predetermined number of frames in the ready-to-send video are set as the background frame, the corresponding energy indicator on the background frames is superimposed in sequence when the current battery energy level is lower than a threshold value.

In the video communication method, such that the threshold value is 5% of the total battery energy level and the predetermined number of frames is two frames.

In order to solve the above-mentioned problem, the present invention adopts a technical solution: providing a video communication device, comprising: an energy obtaining module for obtaining a current battery energy level of a device and a corresponding energy indicator according to the current battery energy level; an image processing module for loading the corresponding energy indicator to the ready-to-send video; and a video communication module for executing video encoding to the ready-to-send video and sending the same.

In the video communication device, such that the energy obtaining module sets a plurality of energy sections and a plurality of energy indicators corresponding to the respective energy sections, and determines which one of the energy sections the current battery energy level is sited, and then obtains the corresponding energy indicator thereof.

In the video communication device, such that the image processing module selects every frame or an interval of a predetermined number of frames in the ready-to-send video as a background frame, and the corresponding energy indicators are superimposed to the background frame in sequence.

Beneficial effects of the present invention are as follows: the present invention can display the information of the energy level of one party's device on the video communication image of another party's device, so that another party can realize the actually current battery energy level of one party's device, tempos of the video communication can be controlled well, effects of the video communication can be raised, and costs of the video communication of the present invention are not increased, and the carrier's network support is not required, so that the present invention has an advantage of lower production cost.

BRIEF DESCRIPTION OF THE DRAWINGS

For a better understanding of the above-mentioned content of the present invention, preferable embodiments are illustrated in accordance with the attached figures for simply explanation. Apparently, the following figures only represent the embodiments of the present invention, the persons with ordinary skill in the art to which the subject invention pertains will more readily understand and obtain other attached figures based on these attached figures.

DETAILED DESCRIPTION OF THE INVENTION

Figure 1:
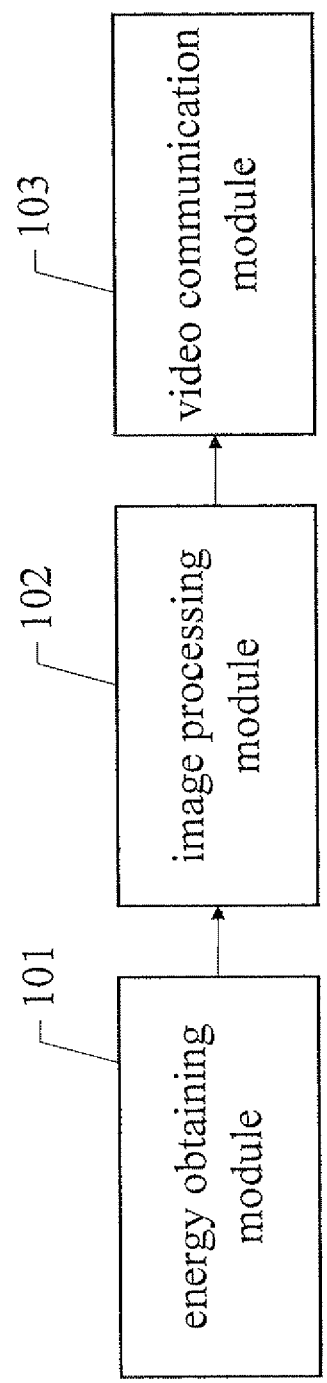
FIG. 1. is a diagram of a video communication device according to a first embodiment of the present invention.

Please refer to FIG. 1. FIG. 1 illustrates a diagram of a video communication device according to a first embodiment of the present invention. As shown in FIG. 1, the video communication device of the present invention comprises an energy obtaining module 101 which can obtain a current battery energy level of one party's video communication device and a corresponding energy indicator according to the current battery energy level; an image processing module 102 which can load the energy indicator to the ready-to-send video; a video communication module 103, which can execute video encoding to the ready-to-send video and send the same.

Operation modes of each module of the above-mentioned are described in detail with reference to FIG. 1 as follows.

In a preferable embodiment of the present invention, the energy obtaining module 101 can obtain an energy indicator corresponding to a current battery energy level through setting a plurality of energy sections and a plurality of energy indicators corresponding to the respective energy sections, and determining which one of the energy sections the current battery energy level is sited, as well send the energy indicator to the image processing module 102.

In particularly, the energy obtaining module 101 can set a full-bar energy indicator, a three-bar energy indicator, a two-bar energy indicator, a one-bar energy indicator, and a red energy indicator which exist in image format, and the energy indicators above-mentioned are stored in a storage module (e.g. a random access memory). The energy obtaining module 101 can divide the total battery energy level as five energy sections, so that each of the energy sections corresponds to one of the above-mentioned energy indicators, that is, the energy section which is 100%-80% of the total battery energy level corresponds to the full-bar energy indicator, the energy section which is 79%-50% of the total battery energy level corresponds to the three-bar energy indicator, the energy section which is 49%-20% of the total battery energy level corresponds to the two-bar energy indicator, the energy section which is 19%-5% of the total battery energy level corresponds to the one-bar energy indicator, the energy section which is less than 5% of the total battery energy level corresponds to the red energy indicator. When the energy obtaining module 101 reads that the current battery energy level is 75% of the total battery energy level, the energy obtaining module 101 can obtain the three-bar energy indicator from the storage module, and the three-bar energy indicator is sent to the image processing module 102.

It is worth mentioning that ways for dividing the energy level can be various, the above-mentioned the way is one of the ways for dividing the battery energy level, and listed for exemplifying conveniently. Furthermore, after the energy obtaining module 101 obtained the current battery energy level, the energy obtaining module 101 firstly confirms whether or not the current battery energy level is sited in the energy section corresponding to the obtained energy indicator, if the current battery energy level is sited in the energy section which corresponds to the obtained energy indicator, then the energy indicator updating is needless, otherwise, the energy obtaining module 101 has to obtain a new energy indicator corresponding to the energy section, and the energy indicator is sent to the image processing module 102.

In addition, in other embodiments of the present invention, the information of the current battery energy level can be presented by text or other formats, and the information of the current battery energy level is loaded to the ready-to-send video, there is no any limitation in the present invention.

After the image processing module 102 obtained the energy indicator, the image processing module 102 can select every frame of a ready-to-send video as a background frame, and the obtained energy indicator is superimposed on the background frame in sequence.

When the current battery energy level is lower than a threshold value, the image processing module 102 can further select frames with an interval of a predetermined number of frame in the ready-to-send video as the background frame, and the energy indicator is superimposed on the background frame in sequence. In the preferable embodiment of the present invention, the threshold value is preferably 5% of the total battery energy level, and the predetermined number of frames is two frames.

Therefore, the image processing module 102 can superimpose the energy indicators on the ready-to-send video.

As mentioned above, under a normal energy condition, the image processing module 102 can superimpose and synthesize the energy indicator corresponding to the current battery energy level with the every frame of video images in sequence, new video images which contains energy indicator of the battery are formed, therefore, the superimposed video images can present stable energy indicators; under a low energy condition, the energy obtaining module 101 sends the red energy indicator to the image processing module 102, the image processing module 102 synthesizes the red hollow-bar energy indicator with the current video images every two frames one time, so that the superimposed video images can present a flickering red energy indicators, thus an effect about prompting low battery is achieved.

After a superimposing process of the image processing module 102 is completed, the video communication module 103 is utilized for executing video encoding to the video images having energy indicator and sending the video images to the party on the other end. The video images having energy indicator can be encoded to a video encoding format which is stipulated in communication protocols adopted by wireless communication apparatus, and the video images having energy indicator are sent in video channels.

Therefore, the video communication device can prompt a user in two ways: one is prompting the user by the stable energy indicator under normal energy condition, the preferably current battery energy level is higher than 5% of the total battery energy level; the other is prompting the user by the flickering red energy indicator under low energy condition, that is, the current battery energy level is lower than 5% of the total battery energy level.

Figure 2:
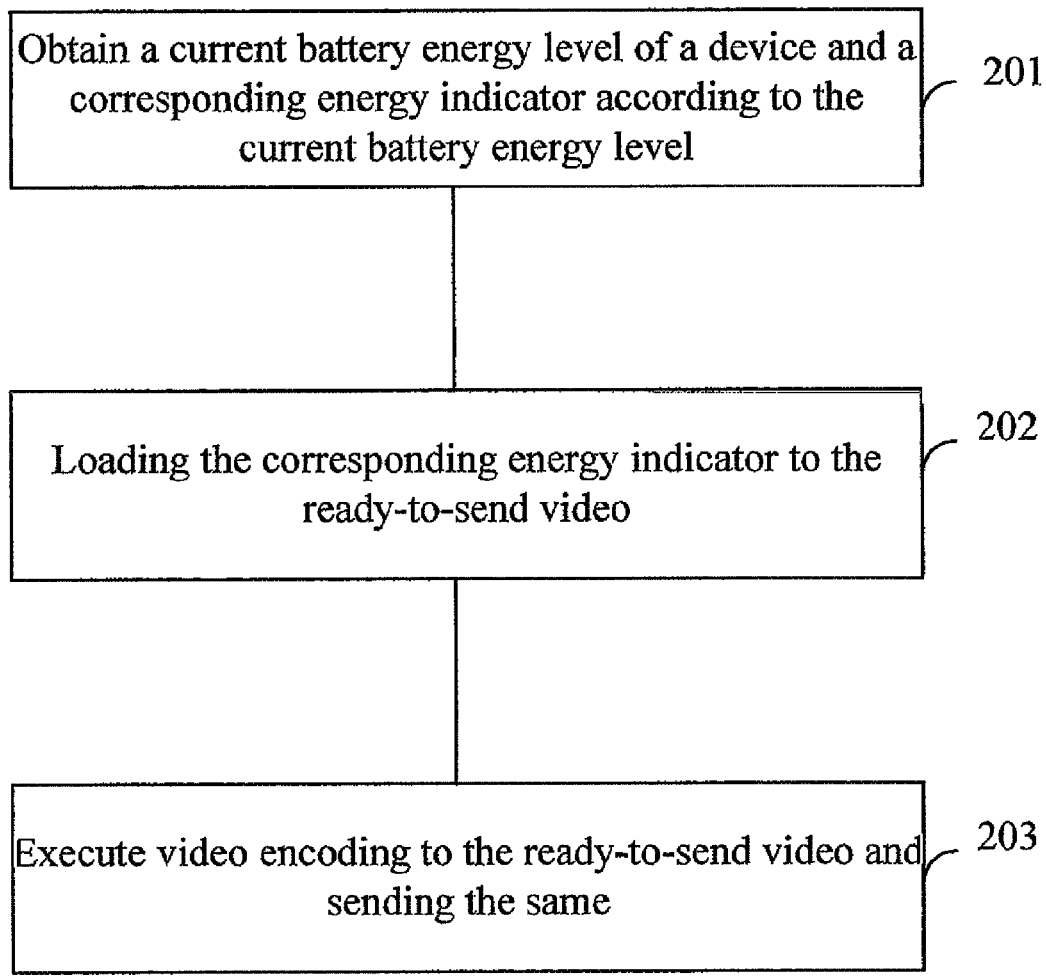
FIG. 2. is a flow chart of a video communication method according to a first embodiment of the present invention.

Please refer to FIG. 2. FIG. 2 illustrates a flow chart of a video communication method according to a first embodiment of the present invention. As shown in FIG. 2, the video communication method of a wireless communication apparatus comprises steps of:

Step 201: a current battery energy level in one party's video communication device and a corresponding energy indicator according to the current battery energy level are obtained, the step can be completed by the energy obtaining module 101, and the energy obtaining module 101 can set a plurality of energy sections and a plurality of energy indicators corresponding to the respective energy sections, and determine which one of the energy sections the current battery energy level is sited, and then obtain the corresponding energy indicator thereof, as well the energy indicator is sent to the image processing module 102.

Step 202: the corresponding energy indicator is loaded to a ready-to-send video, and the step can be completed by the image processing module 102, in particularly, the image processing module 102 can select every frame of the ready-to-send video as a background frame, and superimpose the energy indicator on the background frames in sequence, or when the current battery energy level is lower than a threshold value, the image processing module 102 can select frames with an interval of a predetermined number of frames in the ready-to-send video as the background frames, and superimpose the energy indicator on the background frames in sequence, the threshold value is preferably 5% of the total battery energy level, and the predetermined number of frames is two frames.

Step 203: the ready-to-send video is executed with video encoding to the ready-to-send video and sent the same.

Any video transceiver apparatus executes a video communication with the video communication device of the wireless communication apparatus which is disclosed in the present invention can receive video images prompting energy level information, therefore, the wireless communication apparatus which adopts the video communication device of the present invention can allow another party to know the usage condition of the energy level of the apparatus when it is prompted, the situation that another party does not know when a video communication is interrupted due to low energy level another party can be avoided.

The present invention can display the information of the energy level of one party's device on the video communication image of another party's device, so that another party can realize the actually current battery energy level of one party's device, tempos of the video communication can be controlled well, effects of the video communication can be raised. In addition, because costs of the video communication of the present invention are not increased, and network supports from transportation agencies are needless, so that the present invention has an advantage of lower production cost.

The present invention has been disclosed as the preferred embodiments above, however, the above preferred embodiments are not described for limiting the present invention, various modifications, alterations and improvements can be made by persons skilled in this art without departing from the spirits and principles of the present invention, and therefore the protection scope of claims of the present invention is based on the range defined by the claims.

What is claimed is:

1. A video communication method comprising steps of:
   a. obtaining a current battery energy level of a device, setting a plurality of energy sections and a plurality of energy indicators corresponding to the respective energy sections, determining which one of the energy sections the current battery energy level is sited, and then obtaining a corresponding energy indicator thereof;
   b. selecting every frame of a ready-to-send video as a background frame, superimposing the corresponding energy indicator on the background frames in sequence, and selecting frames with an interval of a predetermined number of frames in the ready-to-send video as the background frames, superimposing the energy indicator on the background frames in sequence when the current battery energy level is lower than a threshold value; and
   c. executing video encoding to the ready-to-send video and sending the same.

2. The method of claim 1, wherein the threshold value is 5% of the total battery energy level and the predetermined number of frames is two frames.

3. A video communication method comprising steps of:
   a. obtaining a current battery energy level of a device and a corresponding energy indicator according to the current battery energy level;
   b. loading the corresponding energy indicator to a ready-to-send video, in which every frame of the ready-to-send video is selected as a background frame, and the corresponding energy indicator is superimposed on the background frames in sequence; and
   c. executing video encoding to the ready-to-send video and sending the same.

4. The method of claim 3, wherein in step a, a plurality of energy sections and a plurality of energy indicators corresponding to the respective energy sections are set, and which one of the energy sections the current battery energy level is sited is determined, and then a corresponding energy indicator thereof is obtained.

5. The method of claim 3, wherein in step b: fames with an interval of a predetermined number of frames in the ready-to-send video are set as the background frames, the corresponding energy indicator on the background frames is superimposed in sequence when the current battery energy level is lower than a threshold value.

6. The method of claim 5, wherein the threshold value is 5% of the total battery energy level and the predetermined number of frames is two frames.

7. A video communication device comprising:
   an energy obtaining module for obtaining a current battery energy level of a device and a corresponding energy indicator according to the current battery energy level;
   an image processing module for loading the corresponding energy indicator to a ready-to-send video, in which the image processing module selects every frame or an interval of a predetermined number of frames in the ready-to-send video as a background frame, and the corresponding energy indicators are superimposed to the background frames in sequence; and
   a video communication module for executing video encoding to the ready-to-send video and sending the same.

8. The device of claim 7, wherein the energy obtaining module sets a plurality of energy sections and a plurality of energy indicators corresponding to the respective energy sections, and determines which one of the energy sections the current battery energy level is sited, and then obtains the corresponding energy indicator thereof.

* * * * *

UNITED STATES PATENT AND TRADEMARK OFFICE
CERTIFICATE OF CORRECTION

PATENT NO. : 8,730,403 B2
APPLICATION NO. : 13/702312
DATED : May 20, 2014
INVENTOR(S) : Zhibing Yang It is certified that error appears in the above-identified patent and that said Letters Patent is hereby corrected as shown below:

In the Claims

Column 6, claim 5:

Line 31 should be corrected as follows:
Change:

-- The method of claim 3, wherein in step b: fames with an -- to

"The method of claim 3, wherein in step b: frames with an"

Signed and Sealed this
Twenty-sixth Day of August, 2014

Michelle K. Lee
*Deputy Director of the United States Patent and Trademark Office*